United States Patent [19]

Le Gallo et al.

[11] Patent Number: 5,315,488

[45] Date of Patent: May 24, 1994

[54] HOST STRUCTURE FOR TERMINAL ADAPTERS

[75] Inventors: Remy Le Gallo, Le Chesnay; Gerard Lyvet, Les Clayes Sous Bois; Bernard Malgogne, Dreux, all of France

[73] Assignee: Bull S.A, Paris, France

[21] Appl. No.: 46,036

[22] Filed: Apr. 12, 1993

[30] Foreign Application Priority Data

Apr. 14, 1992 [FR] France .................. 92 04580

[51] Int. Cl.[5] ................................................ H05K 7/14
[52] U.S. Cl. ............................... 361/796; 361/724; 361/725; 361/752; 361/785; 361/788; 361/803; 174/17 R; 174/261; 439/44; 439/64; 439/74
[58] Field of Search ............... 361/724, 725, 734, 740, 361/741, 752, 778, 785, 788, 796, 803; 174/17 R, 255, 261; 439/65, 64, 61, 74, 44, 55

[56] References Cited

U.S. PATENT DOCUMENTS

| | | | |
|---|---|---|---|
| 4,158,220 | 6/1979 | Yamamoto et al. | 361/415 |
| 4,947,288 | 8/1990 | Olsson et al. | 361/413 |
| 5,010,450 | 4/1991 | Werdin et al. | 361/415 |
| 5,058,110 | 10/1991 | Beach et al. | 370/85.6 |
| 5,173,845 | 12/1992 | Shaw | 361/415 |
| 5,211,565 | 5/1993 | Krajewski et al. | 439/65 |

FOREIGN PATENT DOCUMENTS 9104790  7/1991  Fed. Rep. of Germany .

*Primary Examiner*—Leo P. Picard
*Assistant Examiner*—Young Whang
*Attorney, Agent, or Firm*—Weingarten, Schurgin, Gagnebin & Hayes

[57] ABSTRACT

A host structure is provided for terminal adapters that are part of a distributed computer architecture. Each computer system is in turn connected to a number of synchronous or asynchronous terminals via the network and terminal adapters, each terminal adapter connected, on one hand, to the network and, on the other hand, to at least one terminal via a synchronous or asynchronous transmission link. The host structure can contain a number of adapter cards, each containing the electronic circuit of an adapter, and is composed of a first compartment with the adapter cards, and a second compartment with an equal number of connection cards. The connection cards each enable connecting a number of terminals to a particular adapter.

17 Claims, 4 Drawing Sheets

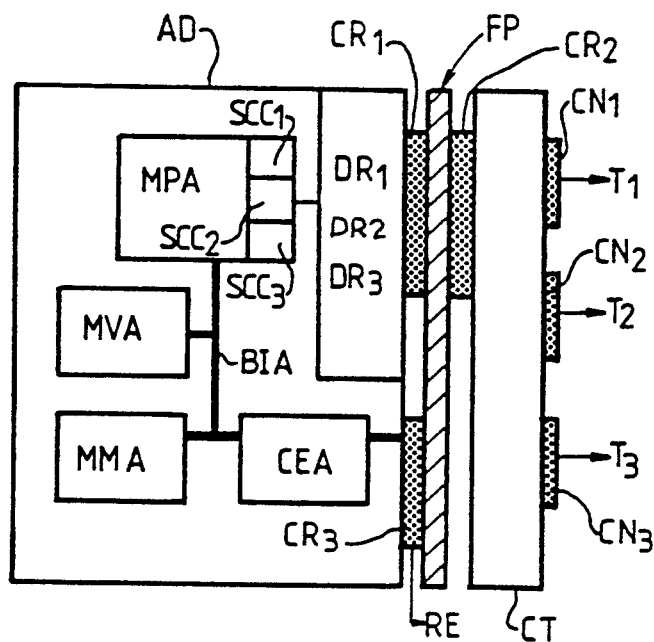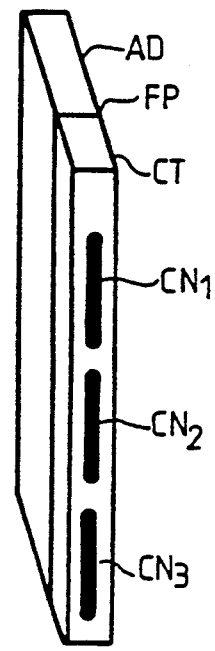
FIG.3a          FIG.3b
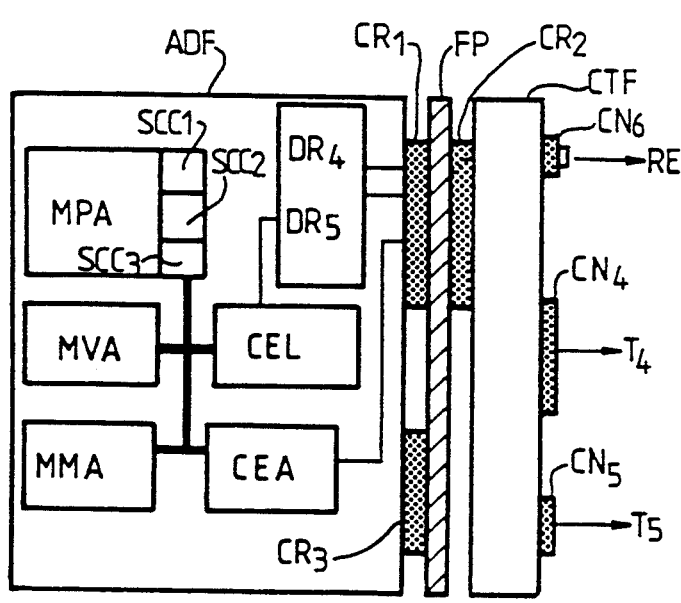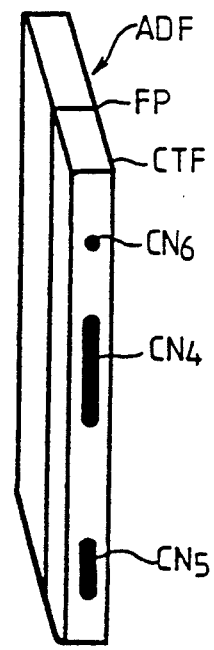
FIG.4a          FIG.4b

HOST STRUCTURE FOR TERMINAL ADAPTERS

FIELD OF THE INVENTION

This invention relates to the field of terminal adapters, and more particularly to a host structure for terminal adapters which are part of a distributed computer architecture, such as a CSMA/CD-type local network, like Ethernet or Cheapernet, for example.

BACKGROUND OF THE INVENTION

CSMA/CD-type local area networks (LANs) are widely known, particularly the Ethernet and Cheapernet networks. Both of the latter two networks will be referred to in the rest of the text under the umbrella term Ethernet network for the sake of simplicity. They are standardized by the Institute of Electrical and Electronics Engineers (IEEE) in the form of IEEE Standard 802.3 and repeated by the International Standards Organization (ISO) in the form of ISO Standard 8802.3. Ethernet networks have a data transmission speed of around 10 Mbits/s.

Due to the technological development of such networks, more and more data terminals can be connected to them, entailing the development of communication servers within the computers themselves that communicate through these networks. The servers reduce the load of a computer's central processing unit (CPU) by managing some of the messages sent by the different constituent elements of the computer, as well as messages coming from other terminals on the network to which the computer is connected.

The development of the power and processing capacity of CPUs of computers makes it possible to have an increasing number of input/output peripherals communicate with the CPUs. These input/output peripherals are most often synchronous or asynchronous terminals communicating with their outside environment over transmission lines at speeds that can range from 300 bits/s to 2 Mbits/s. The transmission modes and the protocols used on the corresponding transmission links to these terminals are defined, for example, in Notes V-24, V-28, V-11, V-35, V-36 of the CCITT (International Telegraph and Telephone Consultative Committee). These transmission links are provided by transmission elements which are actually distinct cables or pairs of twisted wires.

Large, modern networked computer systems can include up to several hundred terminals connected by many cables or sets of wires to the computer or computers which are part of these large systems. When such terminals are distributed within a geographic site with limited area, the existence of a large number of cables or wires poses mechanical and physical problems and poses major space requirements.

The current practice is usually to connect a given computer system to other systems of the same type as well as to its own input/output terminals using an Ethernet network. The computer's communication server is then connected to the input/output terminals via a large number of adapters whose function is to adjust the transmission flow and the transmission protocol of the Ethernet network to the flows and protocols used on the different transmission lines for each input/output terminal. Such adapters are described, for example, in the French patent application filed on Dec. 20, 1990 under No. 90 16031 entitled "Distributed Computer Architecture Using a CSMA/CD-type Local Network," filed by the applicant, which corresponds to U.S. patent application Ser. No. 07/920,321.

Means are known for remotely locating all the transmission elements constituted by cables or sets of twisted wires outside the geographic space occupied by the computer and its communication server, and these means take up a small amount of geographic space. These means define what can be called a host structure for adapters. Such a structure is described, for example, in French patent application 90 16032 filed by the applicant on Dec. 20, 1990 and entitled "Host Structure for Terminal Adapters Belonging to a Distributed Computer Architecture."

Such a host structure includes a first compartment which contains several cartridges, each of which has a card containing the electronic circuit of an adapter, and a second compartment containing the electrical power supply for the adapter cards contained in the first compartment and containing a ventilation device for the structure.

The first and second compartments are adjacent and separated from one another by a backplane assembly with a bus specific to the network to which the adapters are connected. This backplane assembly provides the ability of connecting the bus to said cards and to the network, on one hand, and to the power supply, on the other. The cartridges are parallel to one another and can be removed. On a front edge, the cartridges have a group of connectors to which are connected the transmission elements leading to each of the terminals associated with the adapter contained in said cartridge. The advantage of such a structure is its modular nature. However, it has the following disadvantage: if an adapter must be changed, each of the cables making the connection with the corresponding terminals must be disconnected before the cartridge containing said adapter is pulled out. This is not very practical and causes handling problems as well as losses of time.

SUMMARY OF THE INVENTION

The present invention provides a host structure which facilitates removal of a cartridge containing a defective adapter without having to disconnect cables connected to corresponding terminals.

According to the invention, the host structure is for terminal adapters that are part of a distributed computer architecture, formed for example by a large number of computer systems each connected via the communication servers to at least one network. Each computer system is in turn connected to a large number of synchronous or asynchronous terminals via the network and terminal adapters, each terminal adapter connected, on one hand, to the network and, on the other hand, to at least one terminal via a synchronous or asynchronous transmission link. The host structure can contain a large number of adapter cards, each containing the electronic circuit of an adapter, and is composed of a first compartment with the adapter cards, and a second compartment with an equal number of connection cards. The connection cards are each equipped to enable connecting a certain number of corresponding terminals to a particular adapter.

The first and the second compartments of the host structure are separated by a backplane assembly. Each adapter card is connected via the backplane assembly to a connection card so as to be connected to the terminals which correspond to it, and to said network.

BRIEF DESCRIPTION OF THE DRAWINGS

These and other features, objects and benefits of the present invention can be more clearly understood with reference to the following description of an illustrative embodiment, and to the drawings, in which:

FIG. 3a is a plan view of an adapter card, a connector card, and their arrangement relative to a backplane assembly;

FIG. 3b is a perspective view of the adapter card and connector card of FIG. 3a;

FIG. 4a is the plan view of FIG. 3a in which the adapter card is replaced with a specific adapter card for fast terminals (2 Mbits/s);

FIG. 4b is a perspective view of the fast terminal adapter card and connector card of FIG. 4a;

DETAILED DESCRIPTION

Figure 1:
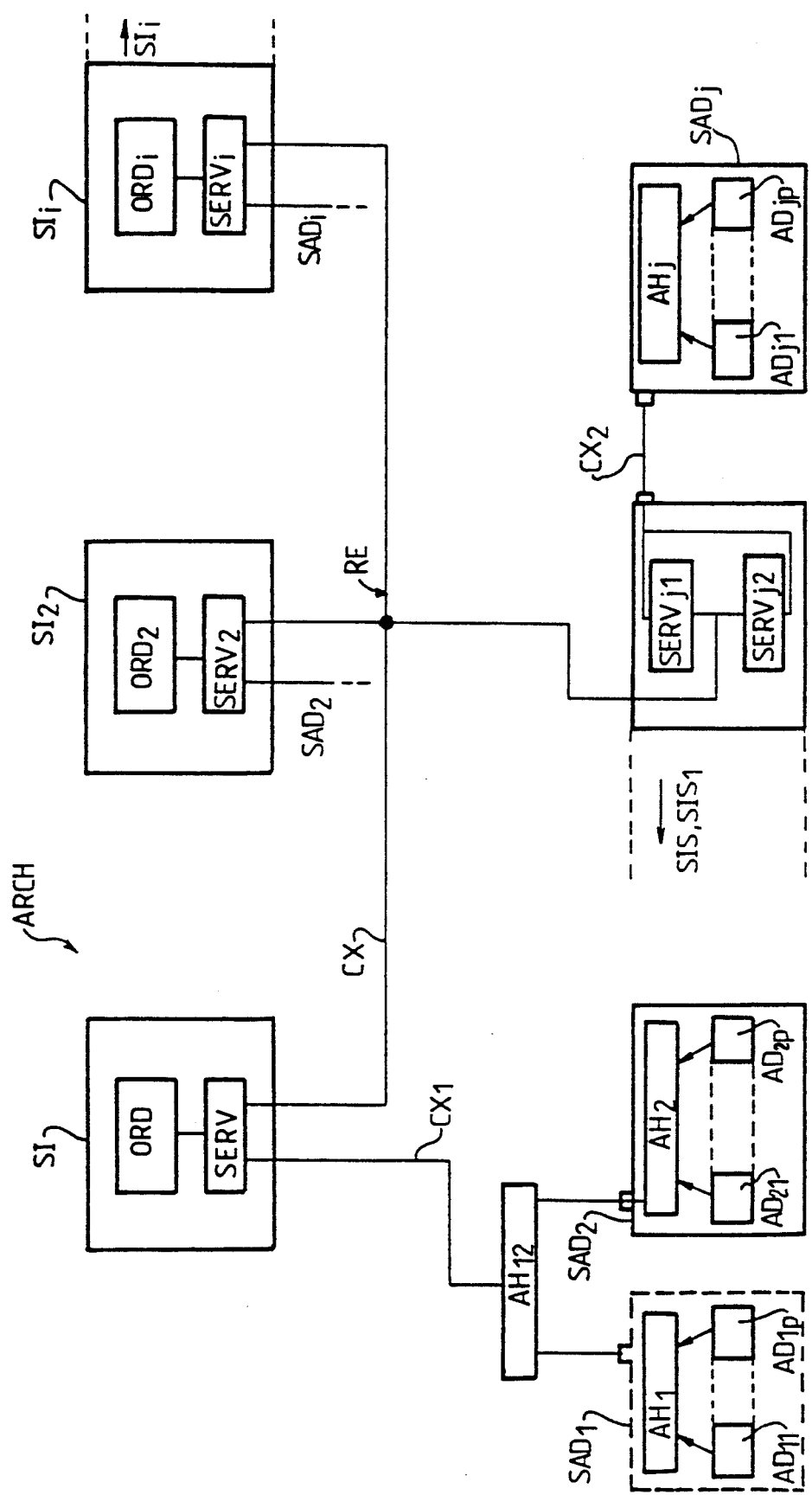
FIG. 1 is a simplified block diagram of a distributed computer architecture of which terminal adapters grouped in a host structure of the present invention are a part.

With reference now to FIG. 1, a distributed computer architecture ARCH is illustrated in which one or more adapter systems SAD are inserted, each contained in a host structure P according to the invention. The architecture ARCH includes a number of main computer systems SI, each containing communication servers SERV as well as a group of server computer systems SIS. The main computer systems SI and the server computer systems SIS are connected to an Ethernet network RE whose transmission element is composed of cables CX. The architecture ARCH includes at least one, and here a plurality of adapter systems $SAD_1$, $SAD_2$, ..., $SAD_i$, $SAD_j$. FIG. 1 shows three adapter systems $SAD_1$, $SAD_2$, $SAD_j$. Each adapter system SAD includes a number p of individual adapter circuits AD, which can be, for example, one of the two adapter circuits AD, ADF shown in FIGS. 3 and 4. Individual adapter circuits AD are electrically connected to a common hub card AH. Thus, exemplary adapter system $SAD_2$ includes adapter circuits $AD_{21}$, ..., $AD_{2p}$, just as adapter system $SAD_j$ includes adapter circuits $AD_{j1}$, ..., $AD_{jp}$. The p adapter circuits of the adapter systems $SAD_1$, $SAD_2$, $SAD_j$ are connected respectively to hub cards $AH_1$, $AH_2$, $AH_j$. In FIG. 1, two adapter systems $SAD_1$, $SAD_2$ are shown connected by their respective hub cards $AH_1$, $AH_2$ to the same hub card $AH_{12}$, which is connected via a coaxial cable $CX_1$ to the server SERV of the main computer system SI. Some examples of communication servers SERV, $SERV_2$, $SERV_1$, as well as the server computer system $SIS_j$ composed of two servers $SERV_{j1}$, $SERV_{j2}$ are described in French patent application No. 90 16031, which corresponds to U.S. patent application Ser. No. 07/920,321 mentioned above. Two adapter systems $SAD_1$, $SAD_2$ associated with a single hub card $AH_{12}$ forms a star structure.

All the main computer systems SI have a similar structure. The main computer system SI includes a computer ORD and a communications server SERV. Similarly, all the server computer systems SIS have the same structure and include a first and second communication server $SERV_{j1}$, $SERV_{j2}$. Each adapter circuit AD is associated with a number of synchronous or asynchronous input/output terminals. In an exemplary embodiment of the invention, three input/output terminals are used.

Figure 2:
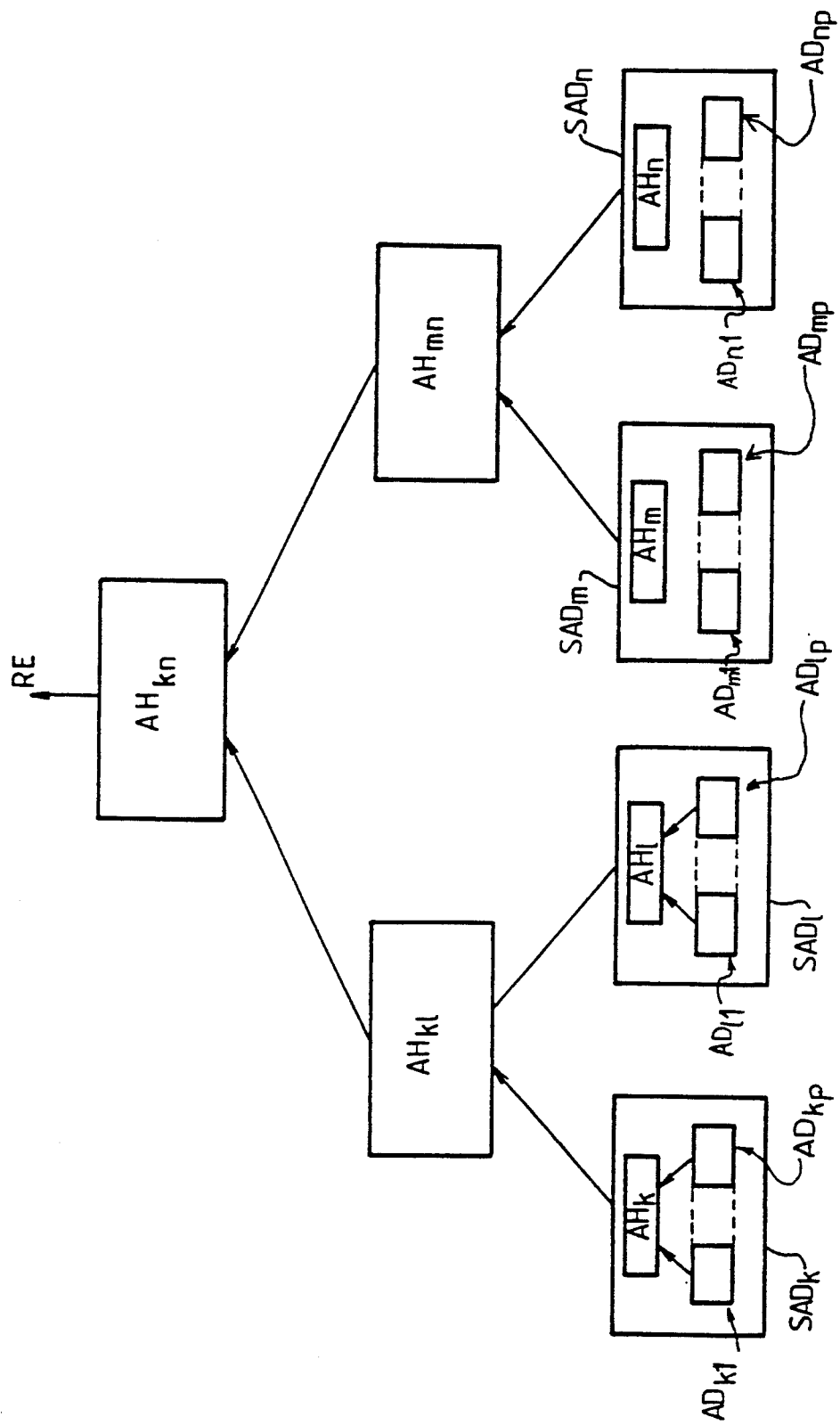
FIG. 2 shows in greater detail how some terminal adapters can be connected to one another, within the host structure of FIG. 1.

With reference to FIG. 2, a more general view of the star structure which makes it possible to connect a number of adapter systems to one another is illustrated. Consider the adapter systems $SAD_k$, $SAD_l$, $SAD_m$, $SAD_n$ of FIG. 2, each having multiple adapter circuits $AD_{k1}$-$AD_{kp}$, $AD_{kp}$, $AD_{l1}$-$AD_{lp}$, $AD_{m1}$-$AD_{mp}$, $AD_{n1}$-$AD_{np}$, respectively. Two adapter systems $SAD_k$ and $SAD_l$ are connected via their respective hub cards $AH_k$ and $AH_l$ to a common hub card $AH_{kl}$, while the other two adapter systems $SAD_m$ and $SAD_n$ are likewise connected via their respective hub cards $AH_m$ and $AH_n$ to a common hub card $AH_{mn}$. The two common hub cards $AH_{kl}$, $AH_{mn}$ are themselves connected to a common hub card $AH_{kn}$. The latter common hub card $AH_{kn}$ is connected directly to the network RE, for example by the coaxial cable CX of FIG. 1. It could also be connected to another hub card AH.

Looking at FIGS. 1 and 2, it can be seen that each adapter system SAD can be considered a specific terminal of the Ethernet network RE. The role of each adapter circuit AD is the following: it receives the Ethernet packets coming from the network RE, stores them and forms packets whose format is specific to the input/output terminal for which the packet is intended. The adapter circuit then transfers the packets formed in this way to each of those terminals. Thus, the Ethernet-type packets are converted into packets specific to each of the input/output terminals by adapting the protocol and the transmission flow for each Ethernet network to the protocol and transmission flow for the specific connections of those same terminals. Of course, the same work is done in the other direction, i.e., from the input/output terminals to the Ethernet network.

An adapter circuit AD, ADF can have a structure belonging to one of the two models shown in FIGS. 3a and 4a. The first adapter circuit model AD, shown in FIG. 3a, includes an Ethernet controller CEA connected via an interface (for example, a Cheapernet-type transceiver) to the Ethernet network RE. The detailed way in which this connection is made in the host structure P according to the invention will be described in detail below in connection with FIG. 5. This controller CEA, for example, is composed of a STNIC circuit manufactured by National Semiconductor. Such a circuit makes it possible to send packets to the network following ISO standard 8802.3 mentioned above or to receive packets coming from the network RE in accordance with the same.

The adapter circuit AD also has a microprocessor MPA associated with a read/write memory MVA and a programmable read only memory MMA, the former having a capacity of 512 KB and the latter having a capacity of 128 KB in one embodiment. In a further embodiment, the adapter circuit AD has three identical serial communication controllers $SCC_1$, $SCC_2$, $SCC_3$, each of which is associated with a specific terminal, i.e., one of the three terminals $T_1$, $T_2$, $T_3$ associated with the adapter circuit AD. In one embodiment of the invention, the microprocessor MPA and the three controllers SCC are composed of a Motorola 68302 microcontroller.

Finally, the adapter circuit AD has a number of line adapters $DR_1$, $DR_2$, $DR_3$, each corresponding to one of the terminals $T_1$, $T_2$, $T_3$ and to one of the serial communication controllers $SCC_1$, $SCC_2$, $SCC_3$. The controller CEA, microprocessor MPA, read/write memory MVA and read only memory MMA elements are connected to the internal bus BIA of the microprocessor MPA.

Details on the operation of the adapter circuit AD and the establishment of dialogue and the dialogue itself between the adapter circuit and a communication server are provided in French patent application 90 16031, which corresponds to U.S. patent application Ser. No. 07/920,321.

Another adapter circuit embodiment ADF is shown in FIG. 4a. This adapter circuit ADF is associated with a number of terminals $T_4$, $T_5$ using fast transmission connections, for example, 256 kbits/s. This adapter circuit ADF has similar controller CEA, microprocessor MPA, read/write memory MVA and read only memory MMA elements as associated with the adapter circuit AD of FIG. 3a. In the embodiment illustrated, it has only two line adapters $DR_4$, $DR_5$ and includes a fast connection controller CEL, a Motorola MC68605x25 for example, which makes it possible to implement the 1984×25-2LAP procedure on the transmission connection for one of the terminals $T_4$, $T_5$. For example, the terminal $T_4$, $T_5$ connections are $V_{11}$, $V_{28}$ or $V_{35}$-type connections. The fast connection controller CEL is connected both to the internal bus BIA of the microprocessor MPA and to the two line adapters $DR_4$, $DR_5$.

Figure 6:
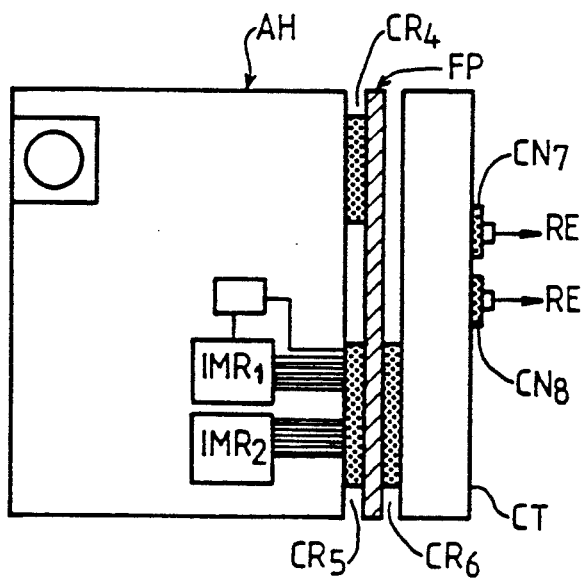
FIG. 6 is a plan view of a hub, a connector card, and their arrangement relative to a backplane assembly.

FIG. 6 shows a hub card AH with two hub circuits $IMR_1$, $IMR_2$ which are commercial components supplied by AMD (Advanced Micro Devices). The hub card AH is connected via connectors $CR_4$, $CR_5$ to the backplane assembly FP. A corresponding connection card CT is connected to the backplane FP by a connector $CR_6$, which is in turn connected wire-to-wire and pin-to-pin to the connector $CR_5$ that goes with the hub card AH. The connection card CT has two cable connectors $CN_7$ and $CN_8$ making it possible to connect each of the two hub circuits $IMR_1$, $IMR_2$ to the network RE.

Figure 5:
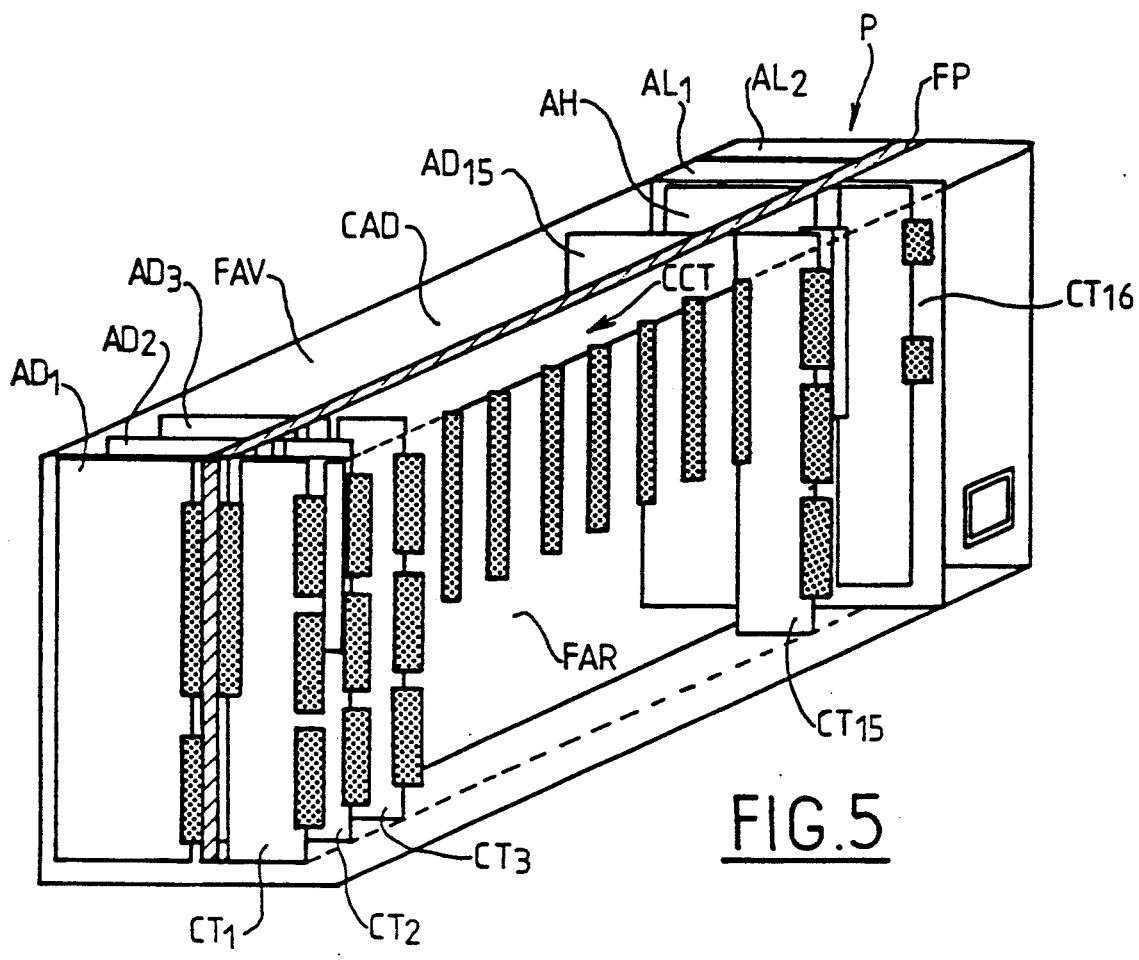
FIG. 5 is a perspective view of a host structure according to the present invention.

FIG. 5 is a physical representation of the host structure model P designed to receive any of the adapter systems $SAD_1$, $SAD_2$, ..., $SAD_i$, $SAD_j$, previously described. In this embodiment, the structure P is shaped like a rectangular parallelepiped with a first compartment CAD located at the left-rear in FIG. 5 and a second compartment CCT located at the right-front in FIG. 5. The first compartment CAD contains a number p of adapter circuits AD; in the embodiment of FIG. 5, this number p is equal to fifteen. These adapter circuits AD are substantially parallel to one another. The host structure P also includes a hub card AH whose dimensions are similar to those of the adapter circuits AD, located at one of the lateral ends of the first compartment CAD of the structure P.

The second compartment CCT has a number of connection cards $CT_1$–$CT_{15}$, corresponding to individual adapter circuits $AD_1$–$AD_{15}$ located in the first compartment CAD. The connection cards CT are substantially parallel to one another, and are spaced the same as the corresponding adapter circuits AD. There are two models of connection cards CT as illustrated in FIGS. 3a and 4a. The first connection card model CT shown in FIGS. 3a and 3b has three cable connectors $CN_1$, $CN_2$, $CN_3$ located one over the other with the same vertical axis of symmetry, making it possible to connect transmission elements for electrical communication with the terminals $T_1$, $T_2$, $T_3$ associated with the adapter circuit AD. The connection card CT also includes a standard 98-point connector $CR_2$ designed to be connected to the backplane assembly FP.

The backplane assembly FP separates the first compartment CAD from the second compartment CCT. In one embodiment it is shaped like a rectangular plate and is substantially the same length and the same height as the structure P itself. This backplane assembly FP makes it possible to connect all the adapters AD and the hub card AH by means of two connectors $CR_1$, $CR_3$, as shown in FIGS. 3a and 4a. The first connector CR permits the connection of the line adapters DR, and the second connector $CR_3$ permits the connection of the adapter AD to the network RE. As can be seen in FIGS. 3a and 4a, one connector $CR_1$ occupies the upper part of the adapter AD, while another connector $CR_3$ occupies the lower part of the adapter AD. In one embodiment, one connector $CR_1$ is a standard 96-point connector, while the other connector $CR_3$ is a standard 48-point connector.

The first connector $CR_1$ on the adapter card AD and the corresponding connector $CR_2$ are both connected to the backplane assembly FP, making possible wire-to-wire, pin-to-pin correspondence of the electrical wires abutting these connectors.

With reference to FIG. 4a and 4b, all of the cable connectors CN are located on an edge of the connector card CT, CTF farthest from the backplane FP within the structure P. It can thus be seen that the cables CX that carry the transmissions to and from the different terminals T associated with the adapter systems SAD are connected on the right-front part of the structure P as illustrated in FIG. 5.

The connection cards CT are stationary and thus remain permanently inside the structure P, while the different adapter circuits AD and the hub card AH are removable. In order to change an adapter circuit AD, the circuit AD is removed from a front side FAV of the first compartment CAD (located on the left-rear in FIG. 5) and replaced with another adapter circuit AD by sliding it from left to right, through the front side FAV of the first compartment CAD. This shows the advantage of the structure P in the invention: replacing the adapters AD is extremely easy, there being no need to disconnect the cabling to the remote terminals as in a structure according to the prior art. Each adapter circuit AD may be equipped, on an upper and lower corner, with handles associated with mechanical means of a known type allowing the adapter circuit AD to be inserted or removed, as well as mounted in the structure P (for example, see French patent application 90 16032 cited above).

FIG. 5 also shows that the structure P includes two electrical power supplies $AL_1$, $AL_2$ located in the first compartment CAD. A first power supply $AL_1$ is designed to power all the adapter circuits AD and hub card AH, while a second power supply $AL_2$ is a back-up power supply designed to replace the first $AL_1$ should the first fail.

Several structures similar to the structure P in FIG. 5 can be located beside one another in one equipment cabinet, with one ventilation system used to cool all of them.

The adapter circuits AD of the structure P shown in FIG. 5 are connected to the hub card AH, in the same way that, for example, the circuit adapters $AD_{21}$, ... $AD_{2p}$ in FIG. 1 are connected to their hub card $AH_2$, via a plurality of printed conductive traces on the backplane assembly FP. Thus, the backplane assembly FP connects the different adapter circuits AD to the hub card AH. In the same way, two hub circuits IMR$_1$, IMR$_2$ are connected via the backplane assembly FP to the two cable connectors CN$_7$, CN$_8$, which are themselves connected to the network RE. The backplane assembly FP is thus a printed circuit that has a number of printed conductors connecting the adapter circuits to a corresponding hub.

Although the invention is shown and described with respect to exemplary embodiments thereof, various other changes, omissions and additions in form and detail thereof may be made therein without departing from the spirit and scope of the invention.

What is claimed is:

1. A host structure for terminal adapters AD to AD15, to H that are part of a distributed computer architecture composed of a plurality of computer systems each connected via communication servers to at least one network, with each computer system connected to a plurality of terminals T1, T2, T3, T4, T5 via the network and terminal adapters, each of said terminal adapters being connected to the network and to at least one corresponding terminal via a transmission connection, said host structure containing a plurality of adapter cards, each with the electronic circuit of an adapter, physically independent from one another, wherein said host structure includes:
    a front side permitting removal of the adapter cards and a back side permitting connection of each adapter card to the network and to the at least one corresponding terminal;
    a front compartment including the front side with adapter cards parallel to one another;
    a back compartment including the back side and connection cards, each one corresponding to an adapter card, and the number of connection cards is equal to the number of adapter cards; and
    wherein the two compartments are separated by a backplane assembly, with each adapter card having means of removal located on the side of the front and first means of connection connecting said adapter card to second means of connection for the connection card via the backplane assembly for connecting each card to the network; each connection card is equipped with third means of connection located on the side of the front for connecting the corresponding adapter card to the at least one corresponding terminal.

2. The host structure according to claim 1, wherein the first compartment includes p adapter cards and at least one connection card parallel to, and with the same dimensions as adapter cards containing at least one hub connected to the backplane assembly, which has conductors making connections between each of the adapters and the hub that the adapter system formed by the adapters and the hub is a star structure.

3. The host structure according to claim 2, wherein the card containing the hub has at least a third connector allowing connection between the hub and the network via a fourth identical connector connected to the third connector CR5, pin to pin and wire to wire via the backplane assembly wherein said fourth connector on the corresponding connection card is connected to the network via the connection card.

4. The host structure according to claim 2, wherein the connection cards are parallel to one another and have the same spacing as that of the corresponding adapter cards.

5. The host structure according to claim 2, wherein the adapter cards include at least two connectors making it possible to for connecting said adapter cards to the backplane assembly, with the first one of said connectors being adapted for connecting the corresponding adapter to the network.

6. The host structure according to claim 1, wherein the connection cards are parallel to one another and have the same spacing as that of the corresponding adapter cards.

7. The host structure according to claim 6, wherein the adapter cards include at least two connectors for connecting said adapter cards to the backplane assembly, with the first one of said connectors being adapted for connecting the corresponding adapter to the network.

8. The host structure according to claim 6, wherein the card containing the hub has at least a third connector allowing connection between the hub and the network via a fourth identical connector connected to the third connector CR5, pin to pin and wire to wire via the backplane assembly, wherein said fourth connector on the corresponding connection card is connected to the network via the connection card.

9. The host structure according to claim 1, wherein the adapter cards include at least two connects for connecting said adapter cards to the backplane assembly, with the first one of said connectors being adapted for connecting the corresponding adapter to the network.

10. The host structure according to claim 9, wherein the second connector is connected via the backplane assembly to an identical connector associated with the corresponding connection card, for connecting said adapter card to the at least one corresponding terminal.

11. A host structure for networked terminal adapters that are part of a distributed computer architecture, comprising:
    a backplane assembly having a plurality of first interface elements on a first side and a plurality of second interface elements on a second side;
    a plurality of first circuit cards adapted for electrical connection with said plurality of first interface elements, said plurality of first circuit cards comprising at least one terminal adapter card and at least one hub card;
    a plurality of second circuit cards adapted for electrical connection with said plurality of second interface elements, said plurality of second circuit cards comprising a plurality of connection cards corresponding to said plurality of first circuit cards; and
    a plurality of cable interface elements disposed on said plurality of second circuit cards for electrically connecting said plurality of second circuit cards to a corresponding plurality of remote terminals.

12. The host structure of claim 11, wherein each of said first interface elements is comprised of a first connector and a second connector.

13. The host structure of claim 12, further comprising:
    a plurality of signal paths disposed within said backplane assembly between said at least one terminal adapter card and said at least one hub card,
    wherein said plurality of first circuit cards are electrically connected to said plurality of signal paths and to a network structure disposed within said backplane assembly by said first connectors.

14. The host structure of claim 12, wherein each of said plurality of second interface elements is comprised of a third connector.

15. The host structure of claim 14, wherein each of said second connectors and each of said third connectors, disposed on said backplane assembly, is adapted for electrical connection between ones of said plurality of first circuit cards and corresponding ones of said plurality of second circuit cards.

16. The host structure of claim 11, wherein each of said plurality of first circuit cards is oriented substantially parallel with another of said plurality of first circuit cards.

17. The host structure of claim 11, wherein each of said plurality of second circuit cards is oriented substantially parallel with another of said plurality of second circuit cards.

* * * * *